United States Patent [19]

Bona

[11] Patent Number: 4,704,960

[45] Date of Patent: Nov. 10, 1987

[54] PRINT ASSEMBLY FOR MAGNETIC AND CLEAR PRINTING MAGNETIC CARDS AND THE LIKE

[75] Inventor: Cesare Bona, Arona, Italy

[73] Assignee: Ages Italia S.p.A., Borgo Ticino No, Italy

[21] Appl. No.: 882,328

[22] Filed: Jul. 7, 1986

[30] Foreign Application Priority Data

Jul. 11, 1985 [IT] Italy .................. 22479/85[U]

[51] Int. Cl.⁴ .............................................. B41J 3/50
[52] U.S. Cl. .................. 101/93.12; 400/105; 400/119
[58] Field of Search ............... 400/582, 105, 119, 607; 101/93.11, 93.12; 270/58

[56] References Cited

U.S. PATENT DOCUMENTS

| | | | |
|---|---|---|---|
| 3,530,793 | 9/1970 | Ritzerfeld | 101/93.12 |
| 3,951,251 | 4/1976 | Zaccagnino, Jr. | 400/105 |
| 3,978,964 | 9/1976 | Kwan | 400/105 |
| 4,519,048 | 5/1985 | Abellana et al. | 101/93.12 |
| 4,552,469 | 11/1985 | Tsuge et al. | 400/119 |
| 4,579,471 | 4/1986 | Hendrischk | 400/605 |
| 4,619,197 | 10/1986 | Pailler | 400/605 |

*Primary Examiner*—E. H. Eickholt
*Attorney, Agent, or Firm*—Guido Modiano; Albert Josif

[57] ABSTRACT

This print assembly comprises a carousel element having circumferentially a plurality of support elements supporting each a stack of magnetic cards to be printed magnetically and in clear, actuators drivingly connected to and rotating the carousel element for positioning one of the support elements at a magnetizing device for the cards, a clear printing device for the cards arranged downstream of the magnetizing device, transport members transporting the picked up cards from the support elements to the magnetizing and the clear printing device, and a selector arranged downstream of the printing device for separating the validly printed cards from the void ones.

10 Claims, 5 Drawing Figures

PRINT ASSEMBLY FOR MAGNETIC AND CLEAR PRINTING MAGNETIC CARDS AND THE LIKE

BACKGROUND OF THE INVENTION

This invention relates to a print assembly for magnetic and clear printing magnetic cards and the like.

As is known, there are presently available on the market devices for magnetically and in clear printing magnetic cards or the like and then selecting the valid printed ones. For performing these operations, the known devices have a whole series of critical and complex operations which are tendentially carried out by specially made automatic equipments.

In particular, these prior design devices are usually equipped with fairly complicated members and linkages having therefore a certain inaccuracy and uncertainty of operation. As a result, a large number of magnetic cards are to be rejected because imperfect and not suitable for the intended use.

SUMMARY OF THE INVENTION

In this situation, it is the aim of this invention to provide a print assembly for magnetic and clear printing magnetic cards and the like which can substantially overcome the above-mentioned drawbacks.

Within this aim, it is an important object of this invention to provide a print assembly for magnetic and clear printing magnetic cards and the like which is readily usable in all of its functions even by non-highly skilled personnel.

Also an object of this invention is to provide a print assembly which has a high overall throughput rate while being construction-wise very simple.

These objects are achieved by a print assembly for magnetic and clear printing magnetic cards and the like, characterized in that it comprises a carousel element having circumferentially arranged support elements surrounding each at least one stack of magnetic cards, actuation means drivingly connected to and rotating said carousel element for positioning one of said support elements on a magnetizing device for the cards, a clear printing device for the cards associated with said magnetizing device, transport means for transporting the cards from a said support element respectively to said magnetizing and clear printing devices, selector means for the cards arranged downstream of said printing device for separating valid cards from void ones, and at least one sensor for recognizing the validity of the cards and correspondingly controlling said selector means.

BRIEF DESCRIPTION OF THE DRAWINGS

Further features and advantages will be more clearly apparent from the detailed description of a print assembly according to the invention, shown by way of illustration and not of limitation in the accompanying drawings, where.

DESCRIPTION OF THE PREFERRED EMBODIMENTS

Figure 1:
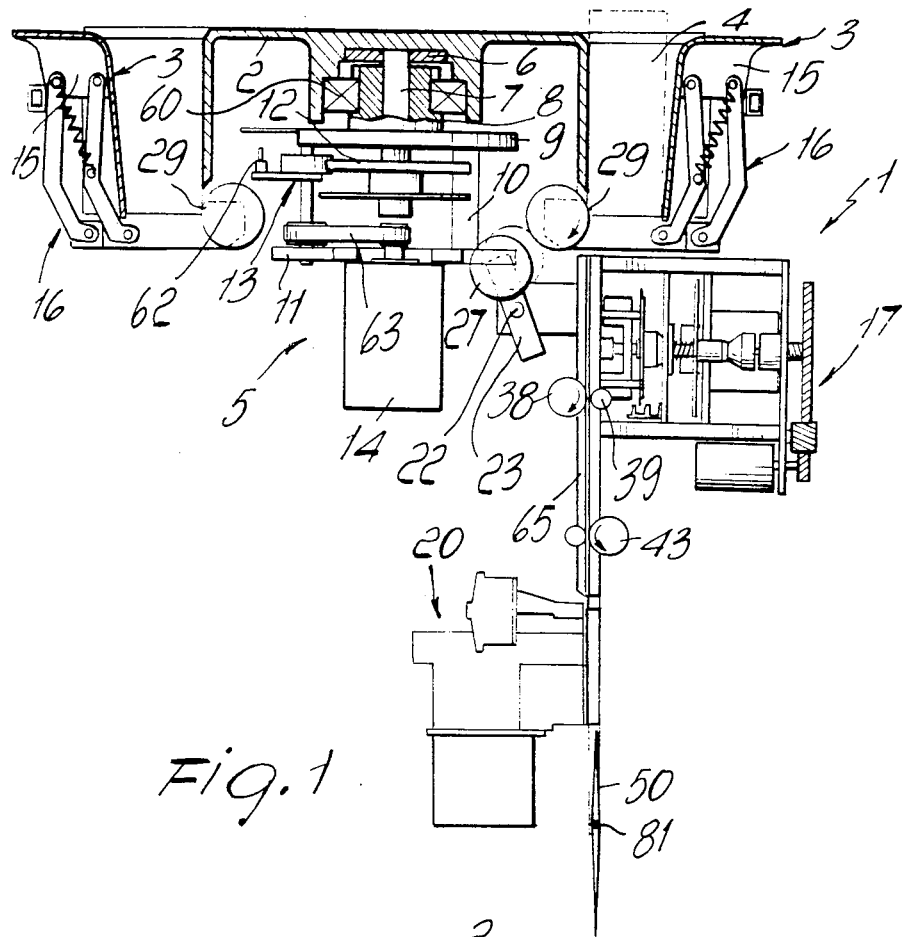
FIG. 1 is a part-sectional side elevation view showing the means of actuating the carousel element for positioning one of the support elements on the magnetizing device of this invention.
Figure 2:
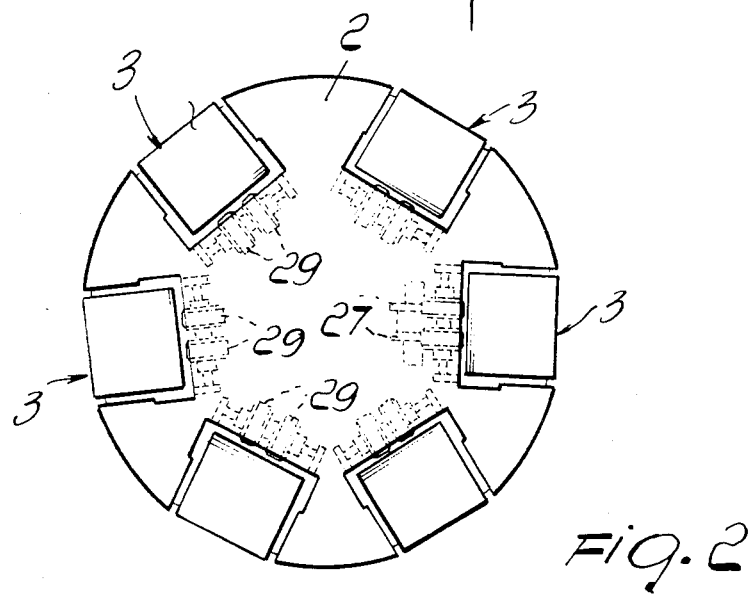
FIG. 2 is a plan view showing the carousel element and the support elements of at least one stack of magnetic cards.

With reference to the drawing figures, the print assembly for magnetic and clear printing magnetic cards and the like, generally designated with the reference numeral 1, comprises a carousel element 2 having peripherally support elements 3 each carrying at least one stack of magnetic cards 4 arranged vertically side-by-side.

In order to rotate the carousel element 2, the assembly 1 is provided with actuating means 5 comprising a disk 6 associated rigidly internally and coaxially with the carousel element 2.

The disk 6 is in turn rigidly connected to a shaft 7 extending internally of a bush 8 rotatably supporting the carousel element 2 through bearings 60; moreover the bush 8 is rigid with a fixed support frame including a first plate 9 and held apart by spacer elements 10, a second plate 11 rigid with the first plate 9 and with a fixed structure not shown in the figure.

The free end of the shaft 7 rigidly carries a Maltese cross 12 which is thus sandwiched between said first and second plates 9 and 11.

The plates 9, 11 have each a hole, the two holes being coaxial with each other and adapted to engage with the interposition of bronze plain bearings, the free ends of a shaft of a tripping member 13 for the intermittent actuation of the Maltese cross 12. In particular the rotation of the Maltese cross is achieved by virtue of the engagement in slots 61 in the Maltese cross by a pin 62 rigid with the tripping member 13 and rotating therewith. In fact the member 13 receives its motion through a belt 63 by a sestep motor 14 of known type supported on the second plate 11 on the side thereof opposite to the Maltese cross 12, and coaxial with the shaft 7.

Each support element 3 consists of a pusher element 15 having a parallelogram linkage, generally indicated at 16, so as to produce a pressure on the stack of cards 4 which is constant across the entire surface thereof during its translation toward the center of the carousel element 2.

Downwardly of the actuation means 5 for the carousel element 2 there is provided a magnetizing device 17 and downwardly of the latter a printing device 20 of known type for printing in clear and, included between these devices, means for transporting the cards from one support element 3, pre-selected during the rotation, respectively to the magnetizing and printing devices 17 and 20. These devices are of known type and therefore are not shown and described in detail.

Figure 4:
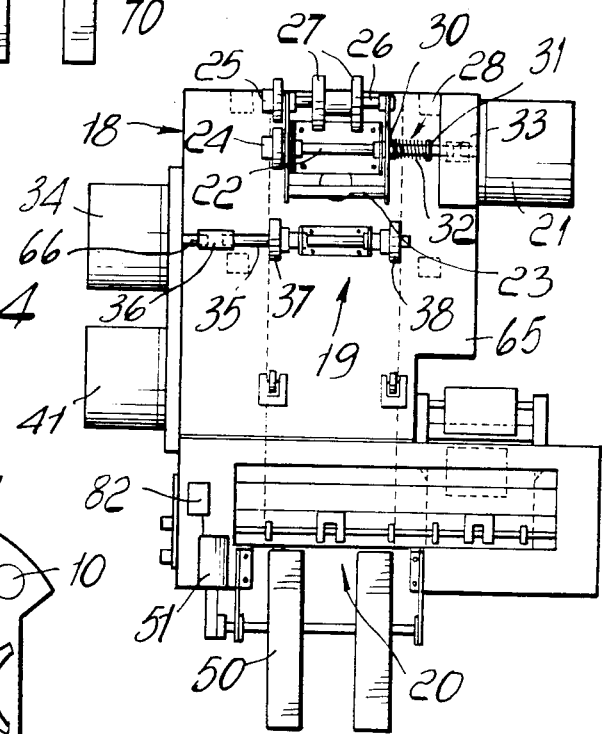
FIG. 4 is a rear elevation view showing the device for printing in clear and the reduced pitch feed assembly.
Figure 5:
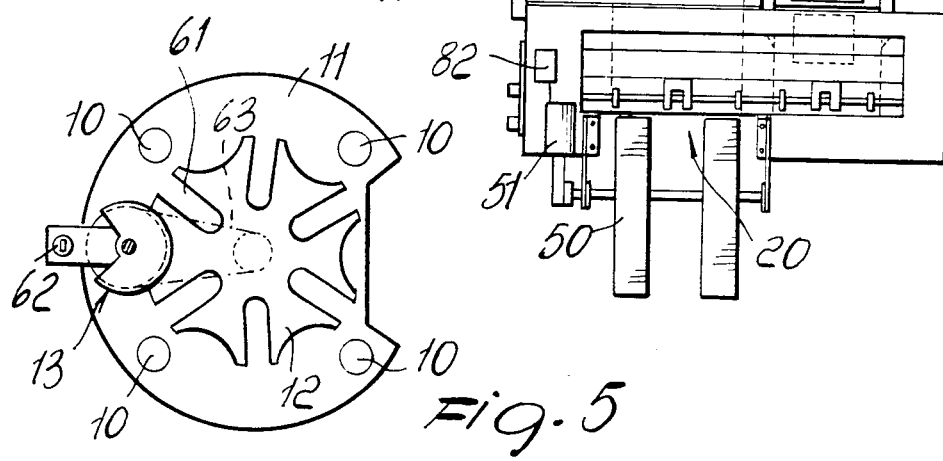
FIG. 5 is a plan view of the means of actuating the carousel element.

The transport means comprises a guide member 65, preferably implemented by a wall defining therein a guide channel for the cards and a plurality of devices 18,19,70 carried by the guide member 75. In detail the transport means includes (FIG. 4) a first device 18 for picking up one of the magnetic cards from the preset support element 3, a second device 19 for transporting the picked up card into the magnetizing device 17, and a third device 70 for transporting the card from the magnetizing device 17 to the printing device 20 and cause a background log or book for registration of the operation effected by the assembly, in a per se known manner, to perform a reduced pitch forward movement simultaneously with the operation of the printing device.

According to one embodiment, the first device 18 may comprise a first step motor 21 of a known type which drives a motion transmitting shaft 22 supporting a rocker element 23.

The shaft 22 rigidly carries a gear wheel 24 meshing with a correspondent gear wheel 25 rigid with a support shaft 26 which in turn rigidly carries a pair of wheels 27.

Between the motor 21 and the motion transmitting shaft 22 a friction clutch assembly 28 is provided which enables the rocker element 23 to oscillate about its pivot point defined by the shaft 22 so as to take the wheels 27 to contact respective idler wheels 29 to put them into rotation and effect a card pick-up from the support element 3.

Advantageously on reversing the rotation direction of the shaft 22 the friction clutch assembly 28 will cause oscillation of the rocker element 23 in the opposite direction so as to separate the wheels 27 from the corresponding wheels 29 and allow the carousel element to rotate freely about its axis (see FIG. 1).

More in detail the friction clutch assembly 28 comprises two small disks 30 and 31 supported coaxially on the motion transmitting shaft 22 and including elastic means therebetween and specifically a spring 32 acting on both disks to respectively push them by friction against a portion of the rocker element 23 and against a sleeve 33 whose function is that of obviating any lack of coaxiality between the drive shaft and the motion transmitting shaft 22.

The second device 19 comprises a second step motor 34 of a known type which drives a small shaft 35 through a sleeve 36 similar to sleeve 33 and connecting the drive shaft 76 of motor 34 to the shaft 35. The small shaft 35 supports two unidirectional wheels 37 and 38 advantageously rotating in one direction only so as to pick-up without speed variations the card from the first device 18 and, in cooperation with two juxtaposed pressure wheels, indicated at 39 and 40, drag the card into the magnetizing device 21.

Figure 3:
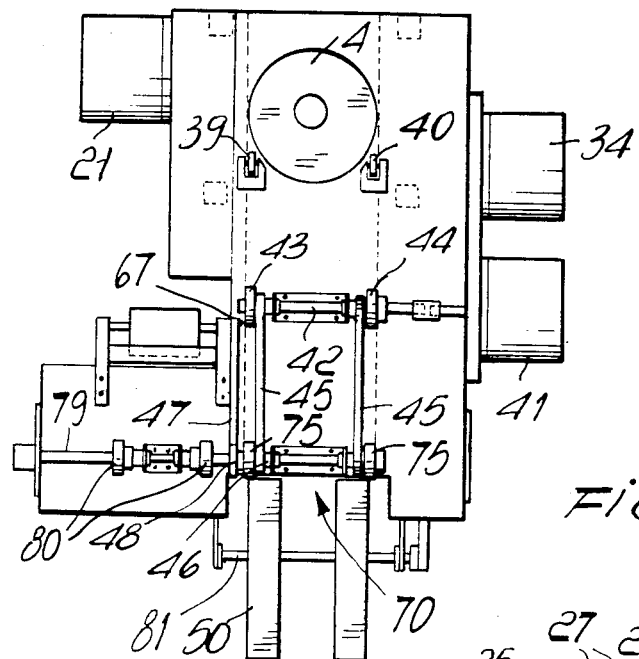
FIG. 3 is a front elevation view of the magnetizing device for the magnetic cards.

The third device 70 (FIG. 3) comprises a third step motor 41 also of known type driving a first shaft 42 supporting a pair of unidirectional wheels 43 and 44 and transmitting, through two cogged belts 45, the movement at the same angular velocity to a second shaft 46 which rigidly carries two unidirectional wheels 75 for discharging the card to the selecting means, which will be described hereinafter.

Advantageously a crank lever 47, with an end thereof, is excentrically hinged at 67 to the wheel 43 for converting the rotatory motion of the wheel 43 to a translatory movement of an opposed end of the lever 47. This opposed end acts then on a unidirectional wheel 48 rigid with a shaft 79 provided with small wheels 80 for entraining a background log or book at a reduced pitch but in step with the magnetic cards.

From the third device 70 the cards are sent to the selecting means comprising a selector 50 hinged to the fixed structure at 81 and cooperating with a magnet of a known type 51. The magnet 51, controlled by a sensor 82 of known type, has the task of oscillating the selector 50 about its hinge point 81 and hence positioning the selector 50 selectively at one of two positions according to whether the transported and printed card is valid or void, thereby causing the card to be discharged on either side of the selector to different containers (not shown).

The operation of the assembly is evident from the preceding description.

In practice the materials used and the dimensions may be any ones according to necessity and the state of the art.

I claim:

1. A print assembly for magnetic and clear printing magnetic cards and the like, comprising a carousel element having circumferentially arranged support elements supporting each at least one stack of magnetic cards, actuation means drivingly connected to and rotating said carousel element for positioning one of said support elements on a magnetizing device for the cards, a clear printing device for the cards associated with said magnetizing device, transport means for transporting the cards from a said support element respectively to said magnetizing and clear printing devices, selector means for the cards arranged downstream of said printing device for separating valid cards from void ones, and at least one sensor for recognizing the validity of the cards and correspondingly controlling said selector means.

2. A print assembly according to claim 1, wherein said support elements comprise each a parallelogram pressure element for producing on the cards a constant pressure across the entire surface thereof during its translation.

3. A print assembly according to claim 1, wherein said actuating means comprises a shaft rigidly and coaxially connected to said carousel element, a bush rigid with a fixed support frame, said bush rotatably accommodating said shaft and rotatably bearing said carousel element, a Maltese cross rigidly connected to said shaft, an actuation tripping member supported on said fixed support frame and step-wise acting on and thereby rotating said Maltese cross, a step motor supported on said fixed support frame and drivingly connected to said tripping member.

4. A print assembly according to claim 1, wherein said transport means comprise a first device for picking-up one magnetic card from said support elements, a second device for transporting the picked up card to said magnetizing device, a third device for transporting the card in said clear printing device and for feeding at a reduced pitch a background log in step with the operation of said printing device.

5. A print assembly according to claim 4, wherein said first device comprises a step motor driving a motion transmitting shaft supporting a rocker element and having a first gear wheel rigid therewith and meshing with a second gear wheel rigid with a support shaft bearing a pair of wheels, between said step motor and said motion transmitting shaft a friction clutch assembly being provided, acting on said rocker element for the oscillation of the latter to bring said pair of wheels in frictional contact with corresponding idler wheels to pick-up one magnetic card from one of said support elements.

6. A print assembly according to claim 5, wherein said motion transmitting shaft is connected with a drive shaft of said step motor by means of an elastic sleeve eliminating any lack of coaxiality between said drive shaft and said drive shaft of said motor.

7. A print assembly according to claim 5, wherein said clutch assembly comprises two small disks, supported coaxially on said motion transmitting shaft, and elastic means included between said two small disks and acting on them to push them respectively against one portion of said rocker element and an elastic sleeve arranged between said motion transmitting shaft and said step motor.

8. A print assembly according to claim 4, wherein said second device comprises a step motor driving a small shaft supporting a pair of unidirectional wheels to pick-up the cards fed by said first device, said second device further comprising pressure wheels juxtaposed to said unidirectional wheels and cooperating therewith to entrain said cards.

9. A print assembly according to claim 4, wherein said third device comprises a step motor driving a first shaft supporting a pair of unidirectional wheels, a second shaft actuated by means of belts by said first shaft, a crank lever eccentrically hinged at one end thereof to said first shaft and having an opposite end thereof acting on and step-wise rotating a unidirectional wheel for said reduced pitch feeding of the background log.

10. A print assembly according to claim 1, wherein said selector means comprises a selector member defining a rotation axis and oscillating thereabout as activated by a magnet to selectively address said cards in diversified directions and to separate valid from void cards.

* * * * *